United States Patent
Yu

(10) Patent No.: US 6,892,004 B1
(45) Date of Patent: May 10, 2005

(54) OPTICAL COUPLING ARRANGEMENT HAVING LOW COUPLING LOSS AND HIGH PRODUCTION YIELD

(76) Inventor: Guomin Yu, 231-740 Springland Drive, Ottawa (CA), K1V 6L8

( * ) Notice: Subject to any disclaimer, the term of this patent is extended or adjusted under 35 U.S.C. 154(b) by 261 days.

(21) Appl. No.: 10/298,612

(22) Filed: Nov. 19, 2002

(30) Foreign Application Priority Data

Jan. 21, 2002 (CA) .............................. 2368945

(51) Int. Cl.[7] .............................. G02B 6/26
(52) U.S. Cl. ...................................... 385/39
(58) Field of Search ............................ 372/18, 29, 33, 372/34, 92, 102, 45, 50, 61; 385/43, 131, 28, 49, 132

(56) References Cited

U.S. PATENT DOCUMENTS

| | | | |
|---|---|---|---|
| 4,904,042 A | | 2/1990 | Dragone ................. 350/96.16 |
| 5,577,141 A | | 11/1996 | Adar et al. ................. 385/43 |
| 5,745,618 A | | 4/1998 | Li ................................ 385/46 |
| 5,745,619 A | | 4/1998 | Li et al. ..................... 385/48 |
| 5,914,972 A | * | 6/1999 | Siala et al. .................. 372/33 |
| 6,229,947 B1 | * | 5/2001 | Vawter et al. ............. 385/132 |
| 2002/0061045 A1 | * | 5/2002 | Zhang et al. ................ 372/61 |
| 2002/0094166 A1 | | 7/2002 | Weerden et al. ............. 385/39 |

FOREIGN PATENT DOCUMENTS

| | | | |
|---|---|---|---|
| CA | 2368945 | * 7/2003 | .................. 385/39 |

OTHER PUBLICATIONS

"2–D Mode Tapering Via Tapered Channel Waveguide Segmentation"; Electronics Letters; Jul. 30, 1992; vol. 28; No. 16; pp. 1514–1516.

"Analysis of periodically Segmented Waveguide Mode Expanders"; Z. Weissman and I. Hendel; Journal of Lightwave Technology; vol. 13; No. 10; Oct. 1995; pp. 2053–2058.

"Very Low Insertion Loss Arrayed–Waveguide Grating with Vertically Tapered Waveguides"; A. Sugita, Member, IEEE, A. Kaneko, K. Okamoto, Member, IEEE, M. Itoh, A. Himeno, and Y. Ohmori, Member, IEEE; IEEE Photonics Technology Letters; vol. 12; No. 9; Sep. 2000; pp. 1180–1182.

"New Design for Low–Loss Star Couplers and Arrayed Waveguide Grating Devices"; Joonoh Park, Youngchul Chung, Soohyun Baek, and Hyung–Jong Lee; IEEE Photonics Technology Letters; vol. 14; No. 5; May 2002; pp. 651–653.

"Low–Loss Arrayed Waveguide Grating with High Index Regions at Slab–to–Array Interface"; K. Maru, T. Chiba, M. Okawa, H. Ishikawa, K. Ohira, S. Sato and H. Uetsuka; Electronics Letters; Oct. 11, 2002; vol. 37; No. 21; pp. 1287–1289.

"Modes of Periodically Segmented Waveguides"; Z. Weissman and A. Hardy, Senior Member, IEEE; Journal of Lightwave Technology; vol. 11; No. 11; Nov. 1993; pp. 1831–1838.

* cited by examiner

*Primary Examiner*—Akm Enayet Ullah

(57) ABSTRACT

An optical coupling arrangement has a first transition region having a plurality of first segmented waveguides and a plurality of transverse segments of alternating indices of refraction with at least some of the transverse segments traversing the first segmented waveguides. The first segmented waveguides are formed by core segments in some of the transverse segments. The arrangement may also have a second transition region having a plurality of second segmented waveguides each aligned with a respective one of the first segmented waveguides. The arrangement is manufactured with a high production yield and is used in an optical coupling device for combining/splitting optical signals to reduce the insertion loss. The optical coupling device is also used in other devices such as Mach-Zehnder devices and arrayed waveguide grating demultiplexers/multiplexers.

27 Claims, 13 Drawing Sheets

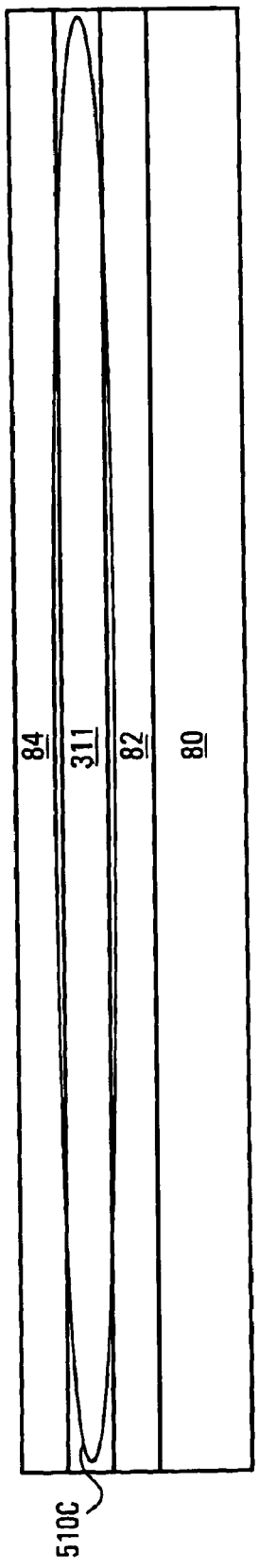
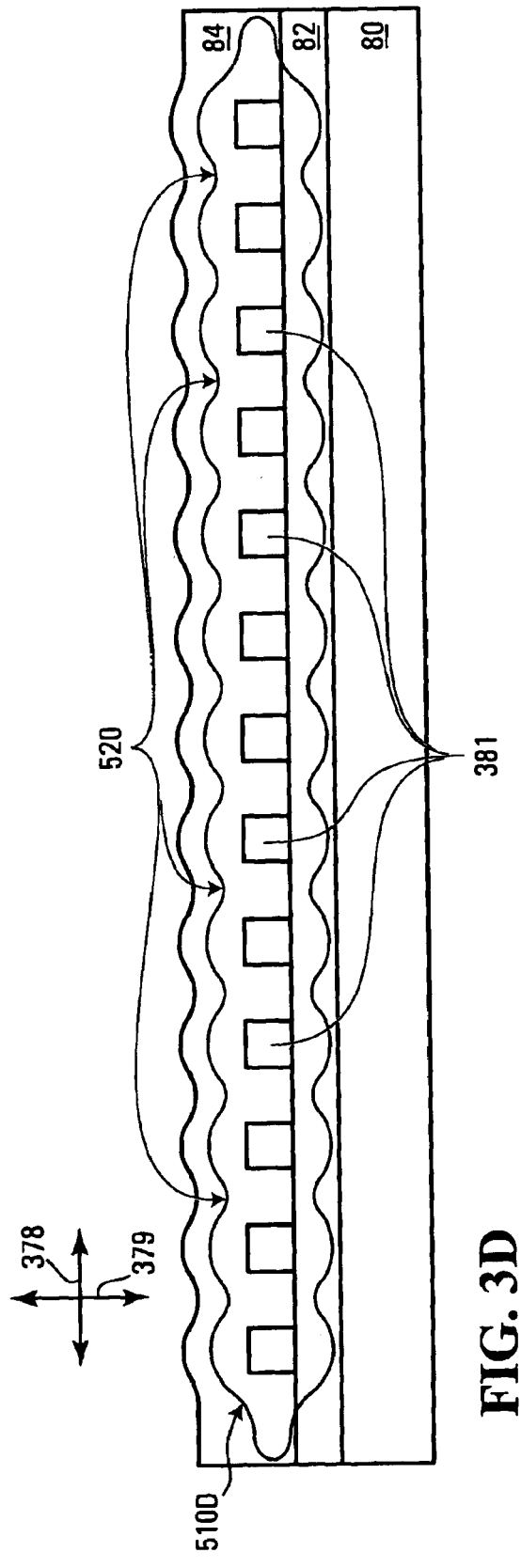

OPTICAL COUPLING ARRANGEMENT HAVING LOW COUPLING LOSS AND HIGH PRODUCTION YIELD

FIELD OF THE INVENTION

This invention relates to optical coupling arrangements for optical couplers and other optical devices using these optical couplers. In particular, the invention relates to improving the insertion loss of the optical couplers while maintaining a high production yield during manufacturing.

BACKGROUND OF THE INVENTION

DWDM (Densed Wavelength Division Multiplexing) systems need optical waveguide devices such as star couplers, branch power splitters, AWG (Arrayed Waveguide Grating) multiplexers/demultiplexers and VOA (Variable Optical Attenuators) to control, combine and separate optical signals having different wavelengths. These optical waveguide devices typically have a planar waveguide structure and the insertion loss of these devices decreases with decreasing size of some of the structural features of the structure. However, during production the fraction of devices fabricated which must be discarded due to defects increases with decreasing size of these structural features. The insertion loss is therefore decreased at the expense of a lower production yield. As such, there is a minimum size for these features for which a reasonable production yield is achieved but at this minimum size the insertion loss is still too high.

For example, a conventional star coupler has a slab waveguide, a first array of waveguides at one end of the slab waveguide and a second array of waveguides at another end of the slab waveguide. The slab waveguide supports optical power transfer between the waveguides of the first array and the waveguides of the second array. In particular, optical power from waveguides of the first array is propagated through the slab waveguide and is received by the waveguides of the second array. For an N×M star coupler, optical signals from N waveguides of the second array each propagate into the slab waveguide and are each split into M optical signals having equivalent powers and propagating through M waveguides of the first array. There are gaps between adjacent ones of the M waveguides of the first array at a junction between the slab waveguide and the first array and these gaps result in a mismatch between the optical field of any one of the N optical signals in the slab waveguide and the optical fields of corresponding M optical signals in the M waveguides of the first array. This mismatch results in a coupling loss which contributes to a major portion of the star coupler's insertion loss. This coupling loss decreases with decreasing width of the gaps and therefore a low coupling loss between the slab waveguide and the first array can be obtained by reducing the width of the gaps. However, the minimum width of the gaps for which these star coupler's can be fabricated with an acceptable production yield is still too large to produce a low insertion loss. For example, for a star coupler having gaps of width of approximately 2 μm the insertion loss of the star coupler is approximately 0.8 dB and this is too high. Furthermore, with conventional technology for fabricating planar waveguide structures, a low production yield is obtained when star couplers are fabricated with such a small width of the gaps.

Some advances have been made to improve the performance of these devices; however, further advances are still limited by the processes used to fabricate these devices.

Referring to FIG. 1A shown is a top view of a conventional star coupler. The star coupler is generally indicated by 102 and has a slab waveguide 10, a first array 14 of first waveguides 26 and a second array 12 of second waveguides 24. The slab waveguide 10 has two circularly curved ends 15a and 15b. There are N=7 second waveguides 24 in the second array 12 which are spaced at equal intervals and extend radially from the curved end 15a. Furthermore, there are M=13 first waveguides 26 in the first array 14 which are spaced at equal intervals and extend radially from the curved end 15b.

The star coupler 102 is typically grown on a wafer. This is shown in FIG. 1B in a cross-sectional view of the first array 14. As shown in FIG. 1B, a layer 82 of under-cladding, which is typically 15 μm in thickness, is on a wafer 80. Each one of the first waveguides 26 has a respective core 27. A layer 84 of top-cladding covers the core 27 and penetrates between the cores 27.

Referring back to FIG. 1A, optical signals 88, each having a respective wavelength $\lambda_i$ and power $P_i$ (i=1 to N), propagate through a respective one of the second waveguides 24 of the second array 12 and into the slab waveguide 10 at the end 15a. Each one of the optical signals 88 of wavelength $\lambda_i$ propagates through the slab waveguide 10 to the end 15b where it is split into M optical signals 90 each having a power $P_i'/M$ and each propagating through a respective one of the first waveguides 26.

$P_i'<P_i$ due to insertion loss in the star coupler 102. A major portion of the insertion loss of the star coupler 102 is from a coupling loss that occurs at a junction 45 between the slab waveguide 10 and the first array 14 due to gaps 56, at the junction 45, between adjacent ones of the first waveguides 26. These gaps 56 lead to a mismatch (or incomplete overlap) between an optical field of any one of the optical signals 88 of wavelength $\lambda_i$ in the slab waveguide 10 and respective optical fields of corresponding ones of optical signals 90 of wavelength $\lambda_i$ in the first waveguides 26 of the first array 14. This is shown in FIGS. 1B and 1C. In particular, FIG. 1C shown is a cross-sectional view of the star coupler 102 through the slab waveguide 10. The slab waveguide 10 has a core 11 located between the layer 82 of under-cladding and the layer 84 of top-cladding and an optical field 92 of one of the optical signals 88 which has a wavelength $\lambda_i$, is shown being strongly confined to the core 11. Corresponding optical fields 94 of respective ones of the optical signals 90, having the same wavelength $\lambda_i$, in the first waveguides 26 of the first array 14 are shown in FIG. 1B. As discussed above, the mismatch between the optical field 92 and the optical fields 94 results in a coupling loss at the junction 45. This coupling loss decreases with decreasing width of the gaps 56. For example, when the gaps 56 have a width, $W_g=4$ μm, the coupling loss is approximately 1.5 dB at an operating wavelength of 1.55 μm. When the gaps 56 have a width, $W_g=2$ μm, the coupling loss is reduced to approximately 0.8 dB. However, such a coupling loss is still too high. Furthermore, for a width $W_g=2$ μm, a significant portion of wafers on which star couplers are produced are unusable due to fabrication defects and this results in low production yield. Typically a width, $W_g$, of 3.3 μm or more is required to obtain a suitable production yield.

Referring to FIG. 2 shown is a top view of another conventional star coupler. The conventional star coupler is generally indicated by 202 and is disclosed by Yuan et al. in U.S. Pat. No. 5,745,618. The star coupler 202 of FIG. 2 is similar to the star coupler 102 of FIGS. 1A, 1B and 1C except that the first array 14 of FIGS. 1A, 1B and 1C is replaced with a first array 28 having first waveguides 26 and a transition region 22 which is adjacent a slab waveguide 20.

The transition region 22 has a plurality of paths 62 made of Silica material. The paths 62 are parallel to each other and intersect transversely the first waveguides 26. A width, $W_s$, of the paths 62 decreases with increasing distance from the slab waveguide 20 with $W_s \geq 2 \mu m$. The use of the transition region 22 reduces the coupling loss between the slab waveguide 20 and the first array 28 from approximately 0.8 dB down to approximately 0.3 dB for $W_g=2 \mu m$. Although the coupling loss is reduced, the reduction in the coupling loss is too small to have star coupler 202 fabricated with gaps 56 of width 3 $\mu m$ or more and maintain a low insertion loss. As such, the star coupler 202 must be fabricated with gaps 56 of width less than 3 $\mu m$ where the production yield is low. A star coupler which can be produced with a high production yield and can offer a low insertion loss is therefore desirable.

SUMMARY OF THE INVENTION

An optical coupling arrangement has a first transition region having a plurality of first segmented waveguides and a plurality of transverse segments, of alternating indices of refraction, at least some of which traverse the first segmented waveguides. The first transition region is delimited by the transverse segments. In some embodiments of the invention a second transition region having a plurality of second segmented waveguides is arranged adjacent the first transition region with each one of the second segmented waveguides of the second transition region being aligned with a respective one of the first segmented waveguides of the first transition region. The transverse segments provide mode expansion in respect to a direction from the first transition region to the second transition region whereas individual ones of the first and second segmented waveguides provide mode contraction in respect to the same direction. The mode contraction results in effective tapering of the first and second segmented waveguides which, in turn, provides a reduced effective width of a gap between adjacent ones of the first segmented waveguides. The reduced effective width is used to lower the coupling loss of the optical coupling arrangement. This is achieved in combination with the mode expansion provided by the transverse segments which allows optical power from an optical signal input into the arrangement to gradually couple into the first segmented waveguides. The optical coupling arrangement is used in optical coupling devices for combining/splitting optical signals and to provide a reduced insertion loss of these devices. The reduction in the insertion loss allows the optical couplers to be fabricated with dimensions large enough for production with a high production yield. The optical coupling devices are also used in other devices such as Mach-Zehnder interferometers and arrayed waveguide grating demultiplxers/multiplexers.

In accordance with a first broad aspect, the invention provides an optical coupling arrangement having a first transition region. The first transition region has a plurality of first segmented waveguides and a plurality of transverse segments of alternating indices of refraction with at least some of the transverse segments traversing the first segmented waveguides. The first transition region is delimited by the transverse segments. The transverse segments and individual ones of the first segmented waveguides are adapted to provide mode expansion and mode contraction, respectively, in respect to a direction traversing the transverse segments.

In some embodiments of the invention, the transverse segments have a plurality of first transverse segments of a core material and a plurality of second transverse segments of a cladding material with the first transverse segments being interleaved with the second transverse segments.

In some embodiments of the invention the first segmented waveguides are formed by core segments in at least some of the second transverse segments. In some embodiments of the invention, the core segments are protrusions with each one of the protrusions extending from a respective one of the first transverse segments into an adjacent one of the second transverse segments.

In some embodiments of the invention, a second transition region is coupled to the first transition region in a manner that the direction defined above traverses from the first transition region to the second transition region. This second transition region has a plurality of second segmented waveguides each aligned with a respective one of the first segmented waveguides of the first transition region.

In some embodiments of the invention, the optical coupling arrangement is used in an optical coupling device for combining/splitting optical signals. The optical coupling device may have a first array of first waveguides which is arranged to be coupled through to the first transition region in a manner that the direction defined above traverses from the first transition region to the first array. Each one of the first waveguides of the first array is aligned with a respective one of the first segmented waveguides of the first transition region. The optical coupling device may also have the second transition region located between the first transition region and the first array. The optical coupling arrangement also has a second array of one or more second waveguides and a first coupling waveguide, for example a slab waveguide, for coupling the second array of one or more second waveguides to the first transition region.

In some embodiments of the invention, the optical device is a star coupler. In other embodiments, an AWG (Arrayed Waveguide Grating) demultiplexer/multiplexer has two star couplers and an AWG couples respective ones of the first waveguides of the two star couplers each with a respective optical path length.

In some embodiments of the invention, the optical device is a branch power splitter in which the second array has one second waveguide. In other embodiments, the optical device is a Y-junction in which the first array has two first waveguides and the second array has one second waveguide.

In some embodiments of the invention, a Mach-Zehnder interferometer device has two Y-junctions and has second coupling waveguides each coupling respective ones of the first waveguides of the two Y-junctions. The Mach-Zehnder interferometer device may be used, for example, as a modulator or a variable optical attenuator.

BRIEF DESCRIPTION OF THE DRAWINGS

Preferred embodiments of the invention will now be described with reference to the attached drawings in which:

FIG. 3C is a cross-sectional view of the star coupler of FIG. 3A;

FIG. 3D is another cross-sectional view of the star coupler of FIG. 3A;

DESCRIPTION OF THE PREFERRED EMBODIMENTS

Figure 3A:
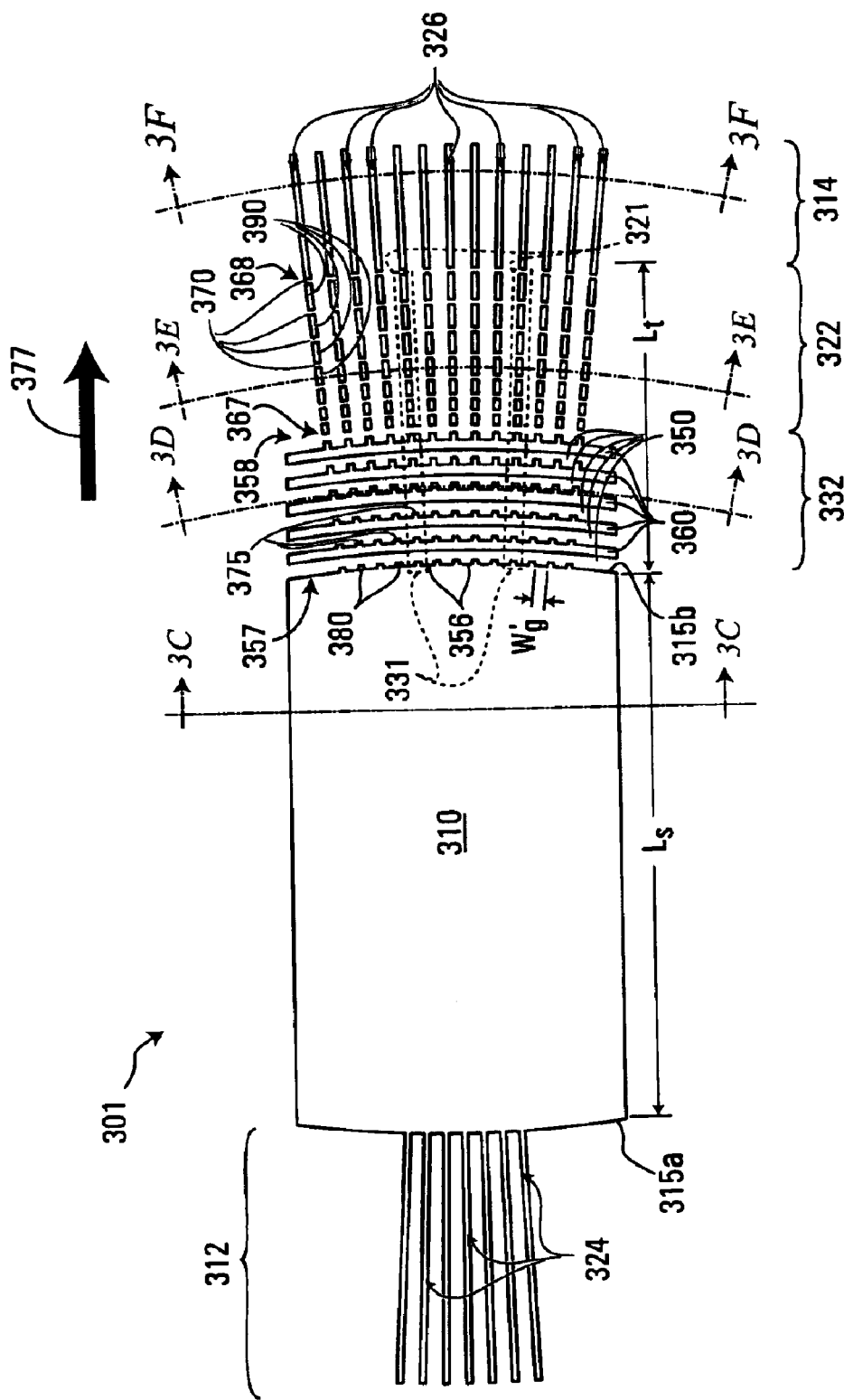
FIG. 3A is a top view of an example star coupler according to one embodiment of the invention.

Referring to FIG. 3A shown is a top view of an example star coupler according to one embodiment of the invention. The star coupler is generally indicated by 301 and has a first coupling waveguide, shown as slab waveguide 310, with preferably circularly curved ends 315a and 315b. In FIG. 3C, a cross-sectional view of the optical coupler 301 through the slab waveguide 310 shows a core 311 of the slab waveguide 310 located between layers 82 and 84 of under-cladding and top-cladding, respectively. Referring back to FIG. 3A, there is a first array 314 of first waveguides 326 and a second array 312 of second waveguides 324 at curved end 315a. A first transition region 332 has first and second ends 357 and 358, respectively, and is adjacent the slab waveguide 310. A second transition region 322 is located between the first transition region 332 and the first array 314.

The first transition region 332 has a plurality of first transverse segments 360 of a core material, and a plurality of second transverse segments 350 of a cladding material interleaved with the first transverse segments 360. The first transition region 332 is delimited by the transverse segments 350, 360. In the embodiment of FIG. 3A, the first transverse segments 360 and the first waveguides 326 have the same core material and the cladding material of the second transverse segments 350 has, a lower index of refraction than the core material. As such, together the transverse segments 350 and 360 form transverse segments of alternating indices of refraction. The first transition region 332 also has first segmented waveguides 331 with the transverse segments 350, 360 traversing the first segmented waveguides 331. The first segmented waveguides 331 are formed by core segments corresponding to protrusions 375 in the first transverse segments 360 and protrusions 380 at the end 315b of the slab waveguide 310. In particular, each of the protrusions 375 extends perpendicularly from a respective one of the first transverse segments 360 into an adjacent one of the second transverse segments 350. Furthermore, each of the protrusions 380 extends perpendicularly from the end 315b of the slab waveguide 310 into an adjacent one of the second transverse segments 350 and are separated by gaps 356 of width $W_g'$.

The second transition region 322 has first and second ends 367 and 368, respectively, and has a plurality of second segmented waveguides 321 each aligned with a respective one of the first waveguides 326 in the first array 314 and aligned with a respective one of the first segmented waveguides 331 in the first transition region 332. The second segmented waveguides 321 are segmented with a cladding material. In particular, each one of the second segmented waveguides 321 in the second transition region 322 has a plurality of first longitudinal segments 390 of a core material and a plurality of second longitudinal segments 370 of a cladding material interleaved with the first longitudinal segments 390 and having an index of refraction which is different than the index of refraction of the core material of the first longitudinal segments 390.

It is noted that the Figures herein are not drawn to scale in order to clarify the invention. In particular, the transition regions 322, 332 are shown extending for a substantial distance from the slab waveguide 310. However, for example, in one embodiment of the invention the slab waveguide 310 has a length, $L_s$, of approximately 1.2 cm whereas the transition regions 322, 332 together have a length, $L_t$, of approximately 0.021 cm.

In the first transition region 332, the transverse segments 350, 360 are adapted to provide mode expansion in respect to direction 377 from the first transition region 332 to the second transition region 322. On the other hand, both the first segmented waveguides 331 and the second segmented waveguides 321 are used to individually provide mode contraction in direction 377. These mode expansion and contractions are used to gradually match an optical field 510C, shown in FIG. 3C, of an optical signal in the slab waveguide 310 to optical fields 510F, shown in FIG. 3F, of corresponding optical signals in the first waveguides 326 of the first array 314. The mode expansion and contractions will be explained in further detail herein below and conditions for obtaining the mode expansion and contractions will now be described.

Figure 3B:
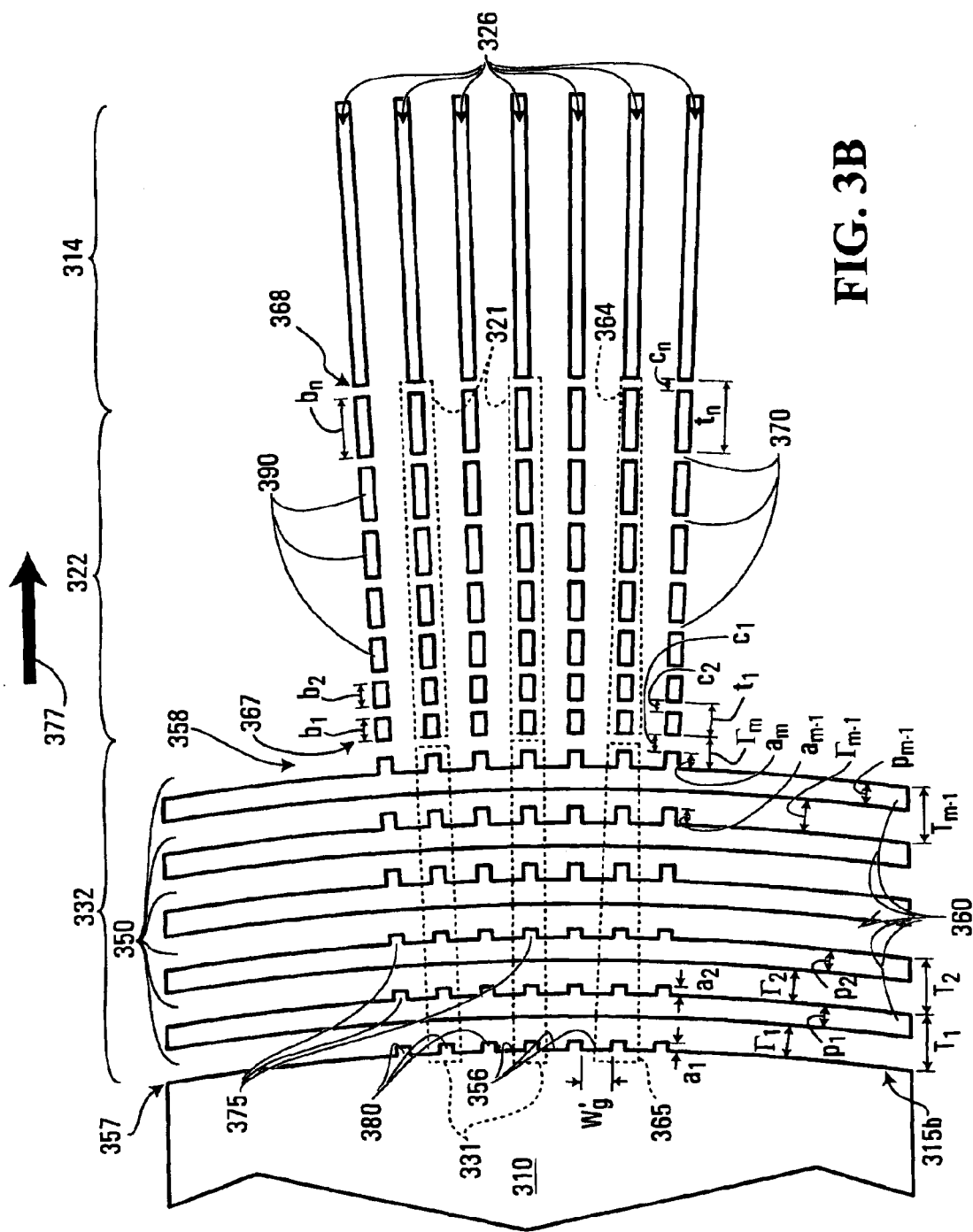
FIG. 3B is a top view of first and second transition regions of the star coupler of FIG. 3A.

Referring to FIG. 3B, shown is an top view of the first and second transition regions 332, 322, respectively, of the star coupler 301 of FIG. 3A. The second transverse segments 350 have a width which is given by $\Gamma_i$ where i=1 to m with m being an integer corresponding to the number of second transverse segments 350. The first transverse segments 360 have a width which is given by, $p_i$. A first transverse segment, i, of the first transverse segments 360 and an adjacent second transverse segment, i, of the second transverse segments 350 have a total width $T_i$ given by $T_i=p_i+\Gamma_i$. In one embodiment of the invention, a ratio $p_i/T_i$ of the width $p_i$ to the total width $T_i$ remains constant with increasing distance from the first end 357 in a direction 377, which traverses the transverse waveguides 350, 360 from the first end 357 to the second end 358. In another embodiment of the invention, the ratio $p_i/T_i$ decreases with increasing distance from the first end 357 in direction 377. In yet another embodiment of the invention, in some portions of the first transition region 332, the ratio $p_i/T_i$ remains constant with increasing distance from the first end 357 in direction 377 while in other portions of the first transition region 332, the ratio $p_i/T_i$ decreases with increasing distance from the first end 357 in direction 377. Generally, $p_i/T_i \geq p_{i+1}/T_{i+1}$, where $p_{i+1}$ is a width of a first transverse segment, i+1, of the first transverse segments 360 which is next to the first transverse segment, i, but farther from the first end 357, and $T_{i+1}$ is a total width of the first transverse segment, i+1, and an adjacent second transverse segment, i+1, of the second transverse segments 350.

Furthermore, in some embodiments of the invention, the total width $T_i$ or the width $\Gamma_i$ is fixed and the width $p_i$ of first transverse segment, i, is greater than or equal to the width $p_{i+1}$ of a next first transverse segment, i+1, of the first transverse segments 360 which is farther from the first end 357, or equivalently, $p_i \geq p_{i+1}$. For example, in one embodiment of the invention, $p_i = \Gamma_i = 10 \mu m$ and m is between 2 and 21, and preferably m=6.

In some embodiments of the invention, the width, $W_g'$, of gaps 356 is between 2 $\mu m$ and 5 $\mu m$, and preferably approximately 4 $\mu m$; however, the invention is not limited to these widths and other widths may be used.

In one embodiment of the invention, the protrusions 375, 380 of the first transverse segments 360 and of the end 315b have a width $a_i$ which remains constant with increasing distance from the first end 357 in direction 377. In other embodiments of the invention, the width $a_i$ increases with increasing distance from the first end 357 in direction 377. In yet another embodiment of the invention, in some portions of the first transition region 332, the width $a_i$ remains constant with increasing distance from the first end 357 in direction 377 while in other portions of the first transition region 332, the width $a_i$ increases with increasing distance from the first end 357 in direction 377. Generally, the width $a_i$ of protrusions within a second transverse segment, i, of the second transverse segments 350 is less than or equal to a width $a_{i+1}$ of protrusions of a next second transverse segment, i+1, of the second transverse segments 350 which is farther from the first end 357, or equivalently, $a_i \leq a_{i+1}$.

In one embodiment of the invention, a ratio $a_i/\Gamma_i$ of the width $a_i$ of protrusions within the second transverse segment, i, to the width $\Gamma_i$ of the second transverse segment, i, remains constant with increasing distance from the first end 357 in direction 377. In another embodiment of the invention, the ratio $a_i/\Gamma_i$ increases with increasing distance from the first end 357 in direction 377. In yet another embodiment of the invention, in some portions of the first transition region 332, the ratio $a_i/\Gamma_i$ remains constant with increasing distance from the first end 357 in direction 377 while in other portions of the first transition region 332, the ratio $a_i/\Gamma_i$ increases with increasing distance from the first end 357 in direction 377. Generally, $a_i/\Gamma_i \leq a_{i+1}/\Gamma_{i+1}$ where $a_{i+1}$ is the width of a protrusion within a second transverse segment, i+1, of the second transverse segments 350, which is next to the second transverse segment, i, but farther from the first end 357, and $\Gamma_{i+1}$ is a width of the next second transverse segment, i+1.

Furthermore, in one embodiment of the invention, the width, $\Gamma_i$, of a second transverse segment, i, of the second transverse segments 350 remains constant with increasing distance from the first end 357 in direction 377. In another embodiment of the invention, the width $\Gamma_i$ increases with increasing distance from the first end 357 in direction 377. In yet another embodiment of the invention, in some portions of the first transition region 332, the width $\Gamma_i$ remains constant with increasing distance from the first end 357 in direction 377 while in other portions of the first transition region 332, the width $\Gamma_i$ increases with increasing distance from the first end 357 in direction 377. Generally, the width $\Gamma_i$ of second transverse segment, i, is less than or equal to a width $\Gamma_{i+1}$ of a next second transverse segment, i+1, of the second transverse segments 350 which is farther from the first end 357, or equivalently, $\Gamma_i \leq \Gamma_{i+1}$.

A first longitudinal segment, j, of the first longitudinal segments 390 within the second transition region 322 has a width, $b_j$, where j=1 to n with n being an integer corresponding to the number of first longitudinal segments within each second segmented waveguide 321. Furthermore, the second longitudinal segments 370 have a width, $c_j$. In one embodiment of the invention, the width, $b_j$, remains constant with increasing distance from the first end 367 in direction 377. In another embodiment of the invention, the width, $b_j$, increases with increasing distance from the first end 367 in direction 377. In yet another embodiment of the invention, in some portions of the second transition region 322, the width $b_j$ remains constant with increasing distance from the first end 367 in direction 377 while in other portions of the second transition region 322, the width $b_j$ increases with increasing distance from the first end 367 in direction 377. Generally, the width $b_j$ of the first longitudinal segment, j, is less than or equal to a width $b_{j+1}$ of a next first longitudinal segment, j+1, of the first longitudinal segments 390 which is farther from the first end 367, or equivalently, $b_j \leq b_{j+1}$.

A first longitudinal segment, j, of the first longitudinal segments 390 and an adjacent second longitudinal segment, j, of the second longitudinal segments 370 have a total width, $t_j = b_j + c_j$. In one embodiment of the invention, the total width, $t_j$, remains constant with increasing distance from the first end 367 in direction 377. In another embodiment of the invention, the total width, $t_j$, increases with increasing distance from the first end 367 in direction 377. In yet another embodiment of the invention, in some portions of the second transition region 322, the total width $t_j$ remains constant with increasing distance from the first end 367 in direction 377 while in other portions of the second transition region 322, the total width $t_j$ increases with increasing distance from the first end 367 in direction 377. Generally, the total width $t_j$ of first longitudinal segment, j, and its adjacent second longitudinal segment, j, is less than or equal to a total width $t_{j+1}$ of a next first longitudinal segment, j+1, of the first longitudinal segments 390 and an adjacent second longitudinal segment, j+1, of the second longitudinal segments 370, or equivalently, $t_j \leq t_{j+1}$.

Furthermore, in one embodiment of the invention, a ratio $b_j/t_j$ of the width, $b_j$, to the total width, $t_j$, remains constant with increasing distance from the first end 367 in direction 377. In another embodiment of the invention, the ratio $b_j/t_j$ increases with increasing distance from the first end 367 in direction 377. In yet another embodiment of the invention, in some portions of the second transition region 322, the ratio $b_j/t_j$ remains constant with increasing distance from the first end 367 in direction 377 while in other portions of the second transition region 322, the ratio $b_j/t_j$ increases with increasing distance from the first end 367 in direction 377. Generally, $b_j/t_j \leq b_{j+1}/t_{j+1}$.

In one example implementation of the invention, m=6, the width, $\Gamma_i = 10 \mu m$, $a_1 = a_2 = a_3 = 4 \mu m$ and $a_4 = a_5 = a_6 = 5 \mu m$. The number of the first longitudinal segments 390 in the second transition region 322 is between 5 and 20 and preferably equal to 7. In the example implementation, in the second transition region 322 n=7, the first longitudinal segments 390 have widths $b_1 = b_2 = 6 \mu m$, $b_3 = 8 \mu m$, $b_4 = 10 \mu m$, $b_5 = 12 \mu m$, $b_6 = 14 \mu m$, and $b_7 = 16 \mu m$ and the longitudinal segments 370, 390 have total widths $t_1 = t_2 = 10 \mu m$, $t_3 = 12 \mu m$, $t_4 = 14 \mu m$, $t_5 = 16 \mu m$, $t_6 = 18 \mu m$, $t_7 = 20 \mu m$. Furthermore, as shown in FIG. 3F in a cross-sectional view of the first array 314 of FIG. 3A, each one of the first waveguides 326 has a respective core 327 having a core thickness, $t_c$, of approximately 6 $\mu m$ and a width, $w_c$, of aproximately 6 $\mu m$; however, other dimensions may be used. Layer 82 of under-cladding and layer 84 of top-cladding have thicknesses, $t_u$ and $t_v$, respectively, each of approximately 15 $\mu m$. The index of refraction of the under-cladding and the top-cladding is approximately 1.445 whereas the index of refraction of a core material of the cores 327 is approximately 1.455, for an operating wavelength of approximately 1.55 $\mu m$.

In some embodiments of the invention, the ratios $a_i/\Gamma_i$ and $b_j/t_j$ preferably satisfy $$a_i/\Gamma_i \leq a_{i+1}/\Gamma_{i+1} \leq b_j/t_j \leq b_{j+1}/t_{j+1}. \quad (1)$$

Equation (1) has the effect of providing mode contraction for individual ones of the first segmented waveguides 331 and the second segmented waveguides 321 in respect to direction 377.

Furthermore, in some embodiments of the invention, the widths $a_i$ and $b_j$ preferably satisfy $$a_i \leq a_{i+1} \leq b_j \leq b_{j+1}, \quad (2)$$

and the widths $\Gamma_i$ and $t_j$ preferably satisfy $$\Gamma_i \leq \Gamma_{i+1} \leq t_j \leq t_{j+1}. \quad (3)$$

In FIG. 3C, the optical field 510C is strongly confined to the core 311 of the slab waveguide 310. This is due to an index of refraction of the cladding material of layers 82, 84 which is lower than the index of refraction of a core material of the core 311 and therefore provides a refractive index contrast with the index of refraction of the cladding material of layer 82, 84.

In the first transition region 332, the first transverse segments 360 and the second transverse segments 350 provide a combined index of refraction which is lower than the index of refraction of the core material of the core 311 of the slab waveguide 310. The lower combined index of refraction results in a reduced refractive index contrast with the index of refraction of the cladding material of layers 82, 84 when compared with the refractive index contrast in the slab waveguide 310. The reduction in the refractive index contrast results in expansion of a mode size in two dimensions shown by axes 378, 379 shown in FIG. 3D. As such, the presence of the second transverse segments 350 allows the optical field 510C to be expanded in the first transition region 332 as shown in FIG. 3D as optical field 510D. In particular, in FIG. 3D, a cross-sectional view through the first transition region 332 of the star coupler 301 shows the optical field 510D being expanded, penetrating into layers 82, 84 and not strongly confined to respective cores 381 of the protrusions 375. In embodiments of the invention in which the ratio $p_i/T_i$ decreases with distance from the first end 357 in direction 377, the refractive index contrast also decreases with increasing distance from the first end 357 to provide a gradual expansion in mode size and, consequently, to provide a gradual expansion of the optical field 510D.

Referring back to FIG. 3B, each one of the protrusions 375, 380 is aligned within a respective one of the first segmented waveguides 331. The effect of the protrusions 375, 380 is to increase the refractive index contrast for each one of the first segmented waveguides 331 causing mode size contraction in respect to axes 378, 379. In embodiments of the invention in which the ratio, $a_i/\Gamma_i$, increases in direction 377, the increase in $a_i/\Gamma_i$ causes a decrease in mode size in direction 377 for individual ones of the first segmented waveguides 331 resulting in the first segmented waveguides 331 being effectively tapered as shown by a taper 365. Furthermore, the effective tapering of the first segmented waveguides 331 provides a reduced effective width of the gaps 356 when compared to the width, $W_g'$, and is used to help reduce the coupling loss. Although the effective tapering of the first segmented waveguides 331 is used to help reduce the coupling loss there is still a mismatch between the optical fields 510C and 510D and optical power may be lost. An additional feature of the first transition region 332 is the mode expansion provided by the presence of the transverse segments 350, 360 which allows optical power, which would normally be lost due to the mismatch between the optical fields 510C and 510D, to be gradually coupled into the first segmented waveguides 331. As such, the tapering effect provided by the protrusions 375, 380 is used in combination with the mode expansion provided by the transverse segments 350, 360 to provide a substantial reduction in the coupling loss.

The effect of having some optical power being coupled into the first segmented waveguides 331 is shown as ripples at 520. The ripples become increasingly prominent with increasing distance from the slab waveguide 310 due to more optical power being coupled into the first segmented waveguides 331 and also due to a corresponding increase in the separation of adjacent ones of the protrusions 375, within a first transverse segment of the first transverse segments 360, with increasing distance from the end 357.

Figure 3E:
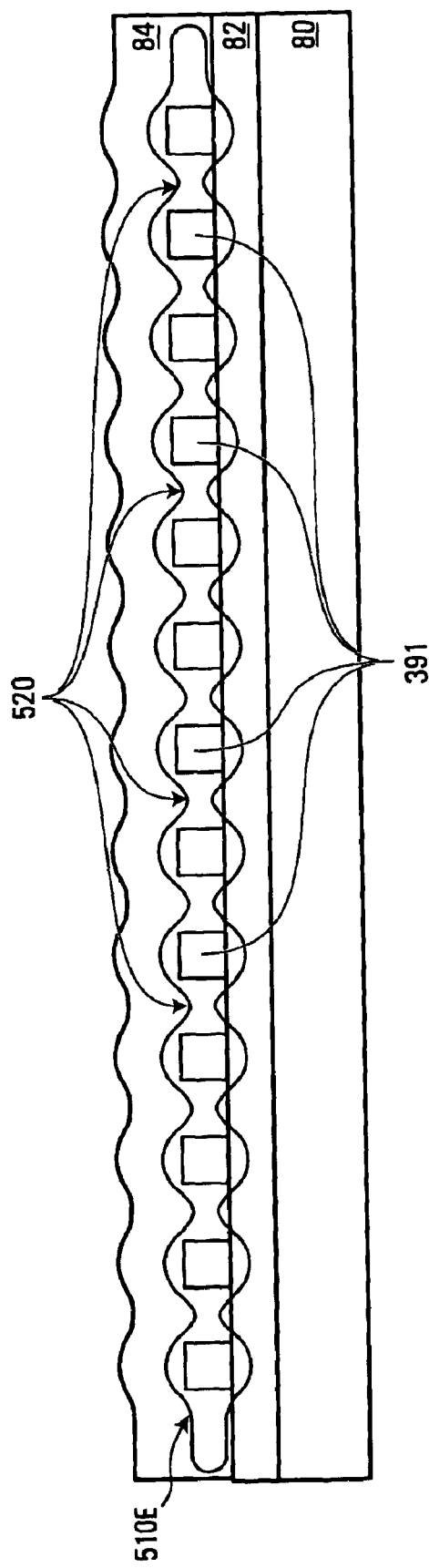
FIG. 3E is another cross-sectional view of the star coupler of FIG. 3A.
Figure 3F:
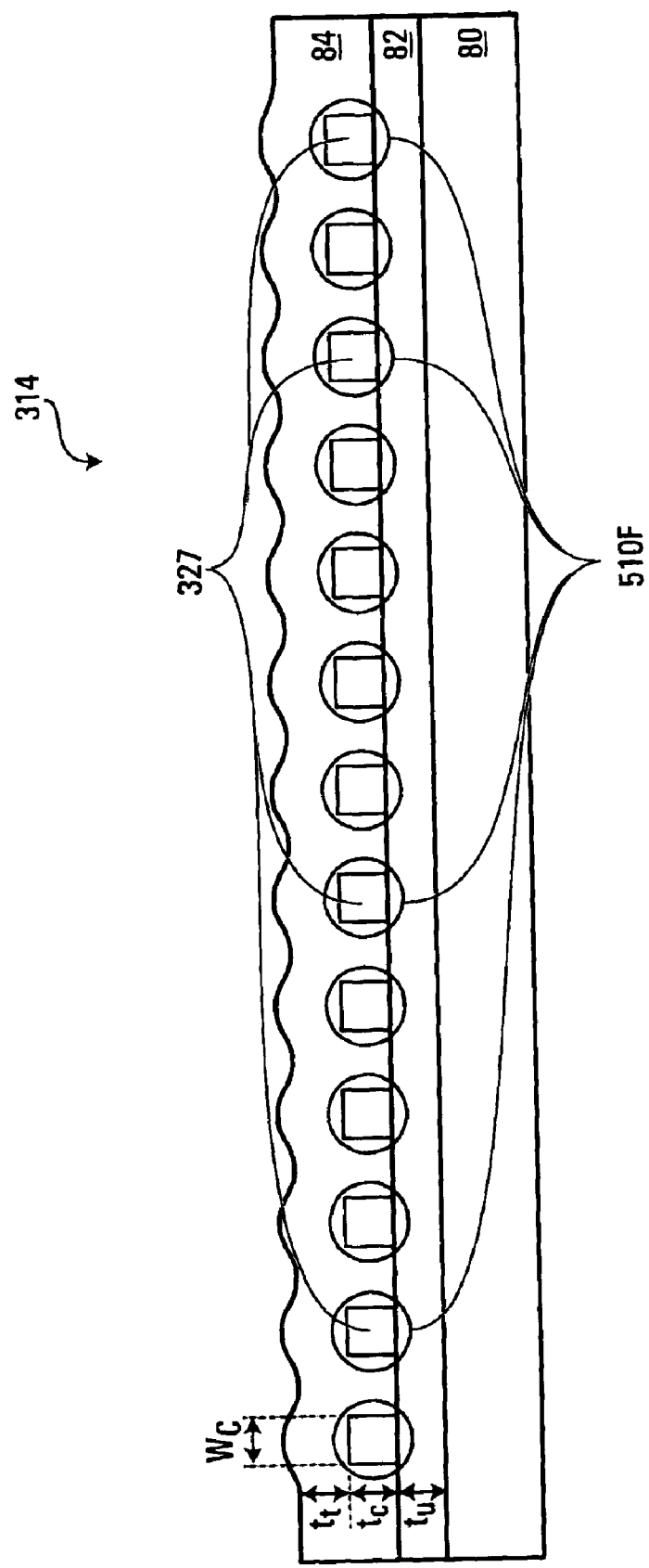
FIG. 3F is yet another cross-sectional view of the star coupler of FIG. 3A.

In the second transition region 322, the first longitudinal segments 390 have cores 391 which are shown in FIG. 3E and which are made of a core material. The presence of the second longitudinal segments 370 with the first longitudinal segments 390 results in a combined index of refraction for the core material of the cores 391 and a material of the second longitudinal segments 370. The combined index of refraction is lower than the index of refraction of the core material of the cores 391. This results in a reduction in a refractive index contrast with the cladding material of layers 82, 84. The purpose of the second transition region 322 is to provide a smooth transition in mode size for individual ones of the second segmented waveguides 321 between the first transition region 332 and the array 314. In particular, the second transition region 322 provides a reduction in mode size with increasing distance from the first end 367 in direction 377. This is due to an increase in the refractive index contrast which arises from an increase in the ratio $b_j/t_j$ with increasing distance from the first end 367 in direction 377. The effect of providing a reduction in mode size within the second transition region 322 is to provide the effect of tapering of the segmented waveguides 390 as shown by a taper 364 in FIG. 3B.

A cross-sectional view of the star coupler 301 through the second transition region 322 is shown in FIG. 3E with an optical field 510E of the optical signal becoming strongly confined to the cores 391 of the first longitudinal segments 390. Furthermore, the ripples at 520 become more prominent due to the tapering effect to the second segmented waveguides 321, which results in stronger confinement of the optical field 510E to the cores 391, and due to an increase in the separation of the second segmented waveguides 321 with increasing distance from the first end 367 in direction 377.

Finally, in the first array 314, the first waveguides 326 have respective cores 327 which are shown in FIG. 3F and which are made of a core material. The core material has an index of refraction which is higher than the combined index of refraction of the longitudinal segments 370, 390 of the second transition region 322 and this results in an increase in the refractive index contrast with the cladding material of layers 82, 84. This increase in the refractive index contrast causes a further reduction in mode size when compared to the mode size in the second transition region 322. This reduction in mode size causes the optical fields 510F of FIG. 3F to be strongly confined to the cores 327 of the first waveguides 326 resulting in no overlap between adjacent ones of the fields 510F. The lack of overlap between adjacent ones of the fields 510F is also due to an increased separation between the cores 327 of the waveguides 326 with increasing distance from the slab waveguide 310.

Figure 1A:
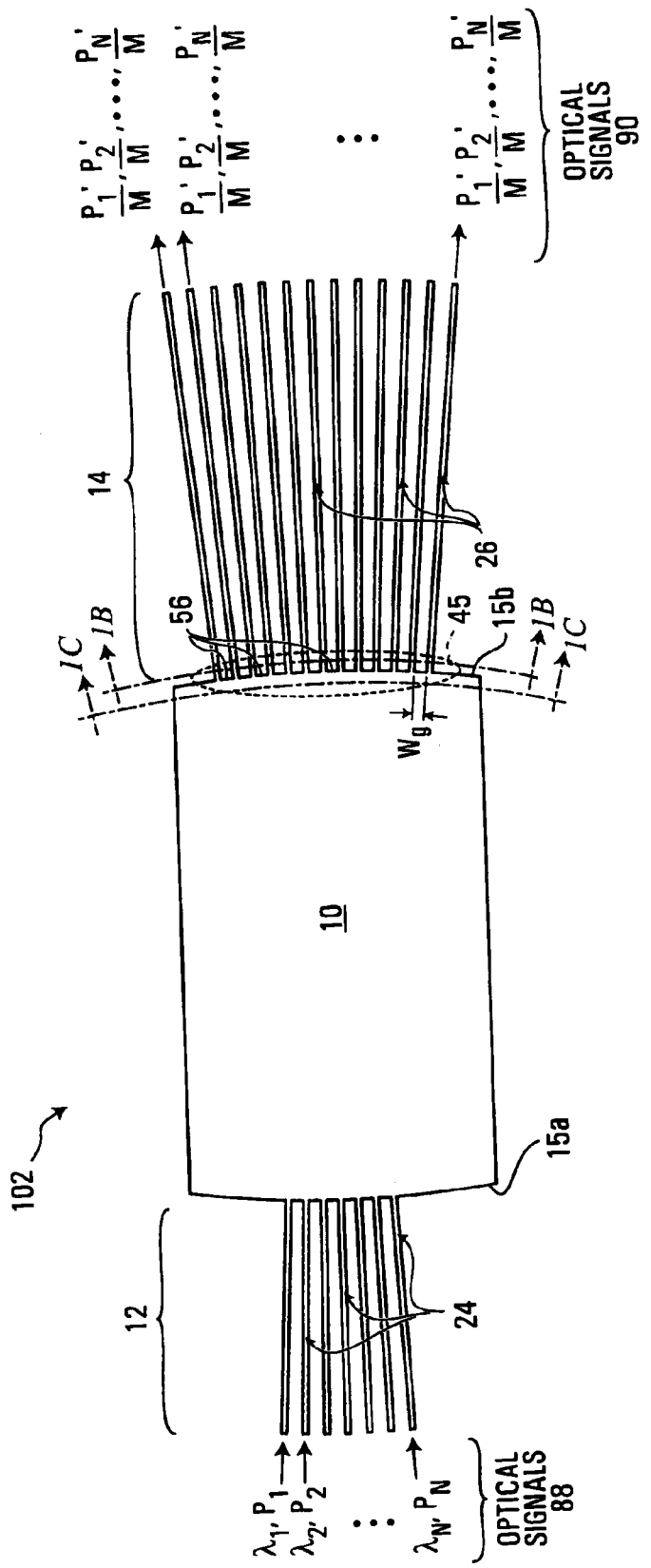
FIG. 1A is a top view of a conventional star coupler.
Figure 1B:
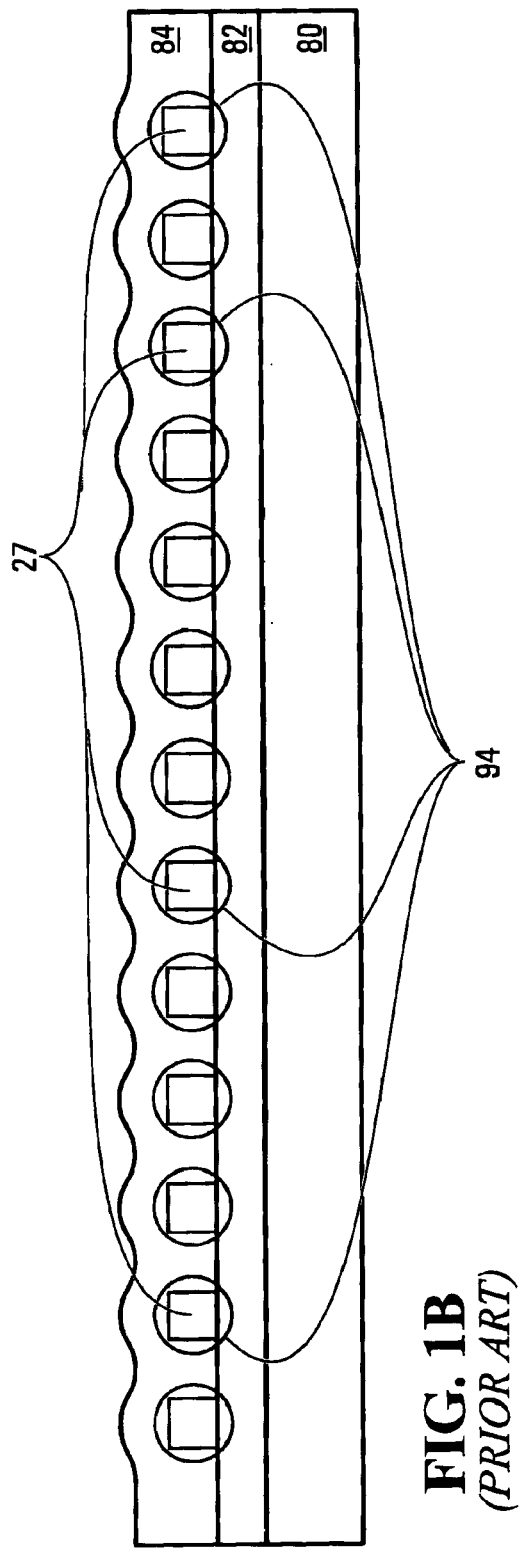
FIG. 1B is a cross-sectional view of the conventional star coupler of FIG. 1A.
Figure 1C:
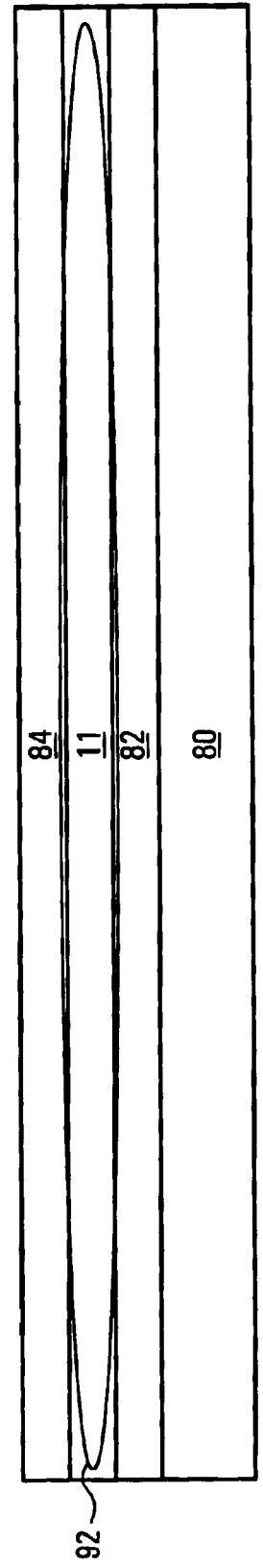
FIG. 1C is another cross-sectional view of the conventional star coupler of FIG. 1A.
Figure 2:
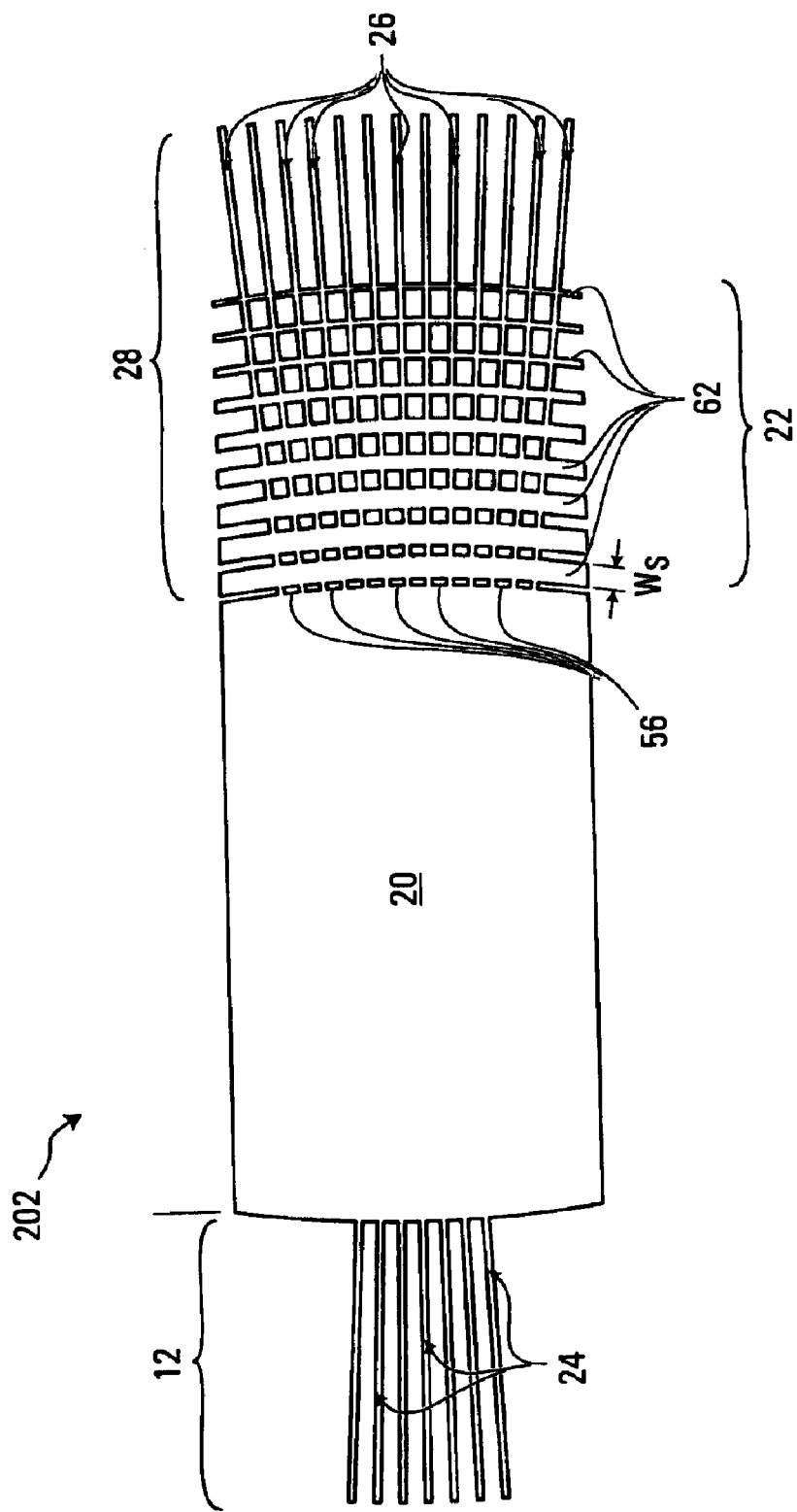
FIG. 2 is a top view of another conventional star coupler.

With a width $W_g'$ of approximately 4 µm and when compared to the conventional star coupler 102 of FIGS. 1A, 1B and 1C, the coupling loss between the slab waveguide 310 and the first array 314 is reduced from approximately 1.5 dB down to about 0.4 dB. Such a low coupling loss is achieved for a width $W_g'$ of approximately 4 µm, and with a minimum of approximately 4 µm for the width, $c_j$, of the second longitudinal segments 370. These dimensions for the widths $W_g'$ and $c_j$ are dimensions for which the production yield remains high. Furthermore, it is noted that results show that fabrication processing variations such as dimensional variations in any structural feature of the transition regions 322, 332 and variations in refractive indices have negligible effects on the insertion loss, the return loss and the production yield. An added feature of the invention is that during fabrication, the second transverse segments 350 can be incorporated into the first transition region 332, and the second segmented waveguides 321 may be segmented using existing common planar waveguide technology without involving any additional fabrication processing steps.

Embodiments of the invention are not limited to the dimensions used above and other dimensions may be used. Furthermore, in the embodiment of FIGS. 3A to 3F, the layer 82 of under cladding, layer 84 of top-cladding and the cores 311, 327, 381, 391 are made of silica with a low refractive index contrast of approximately 0.01 between the cladding and core materials. Other materials such as, for example, silicas with high refractive index contrast, silicon-on-silica, SiON (Silicon Oxynitride), polymers, sol-gel, LiNbO$_3$, and InP (Indium Phosphide) may be used.

Figure 4A:
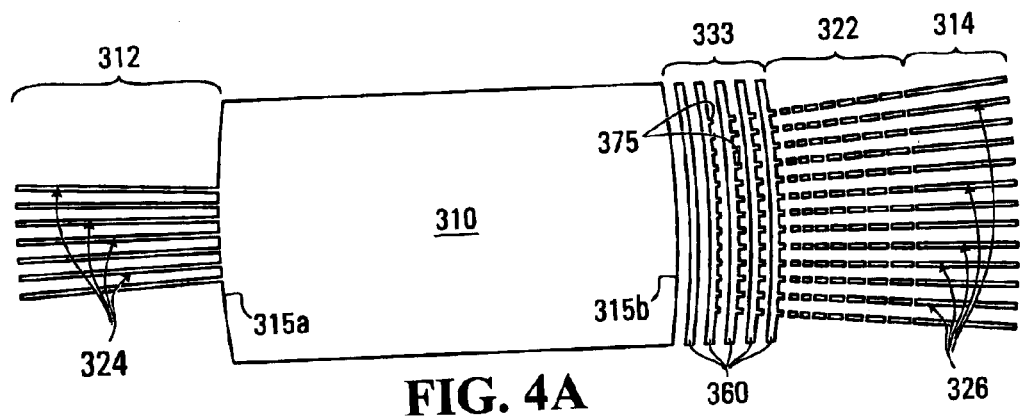
FIG. 4A is a top view of a star coupler according to another embodiment of the invention.
Figure 4B:
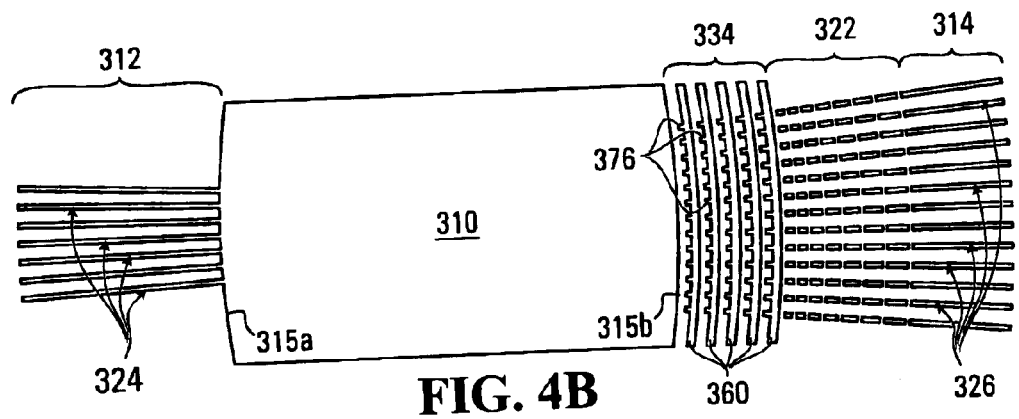
FIG. 4B is a top view of a star coupler according to another embodiment of the invention.
Figure 4C:
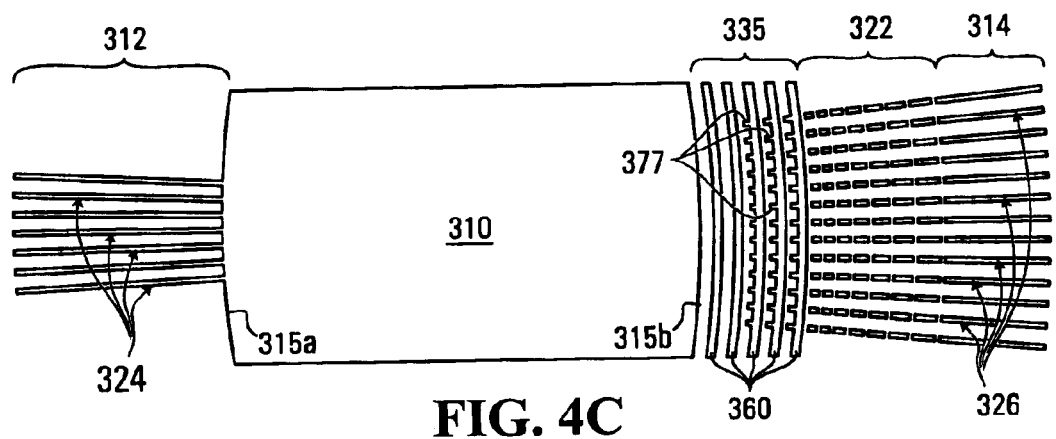
FIG. 4C is a top view of a star coupler according to another embodiment of the invention.
Figure 4D:
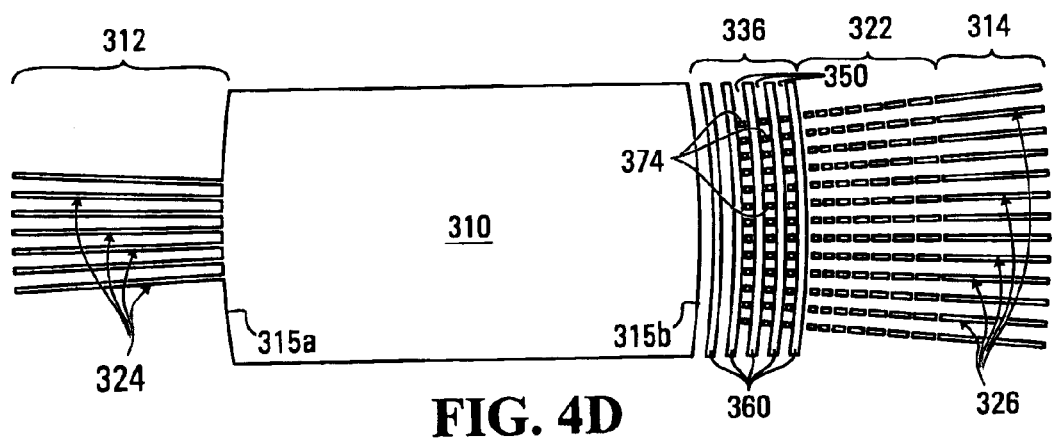
FIG. 4D is a top view of a star coupler according to another embodiment of the invention.

Referring to FIG. 4A, shown is a star coupler according to another embodiment of the invention. The star coupler has a first transition region 333 which similar to the first transition region 332 of the star coupler 301 of FIG. 3A except that the end 315b and one of the first transverse segments 360 which is closest to the slab waveguide 310 have no protrusions. More generally, at least one of the first transverse segments 360 has protrusions. In FIG. 4B, a star coupler provided by another embodiment of the invention has a first transition region 334 which has protrusions 376 directed towards the slab waveguide 310. This contrasts with the first transition region 332 in which the first transverse segments 360 have protrusions 375 extending away from the slab waveguide 310. Finally, in another embodiment shown in FIG. 4C, the end 315b of the slab waveguide 310 and two of the first transverse segments 360 which are closest to the slab waveguide 310 have no protrusions and the other first transverse segments 360 have protrusions 377 extending towards the slab waveguide 310. Alternatively, in another embodiment of the invention, at least one of the first transverse segments 360 have protusions extending both towards and away from the slab waveguide 310. In some embodiments of the invention, the protrusions 375, 376, 377, 380 are replaced with core segments. For example, in yet another embodiment shown in FIG. 4D, the first transverse segments 360 of a first transition region 336 have no protrusions; however, there are core segments 374 between some of the first transverse segments 360 and each within a respective one of the second transverse segments 350. The core segments 374 have similar physical characteristics as the protrusions 375, 376, 377, 380, being characterized by the same width, $a_j$, except that the core segments 374 of FIG. 4D are not in contact with the first transverse segments 360.

Figure 5:
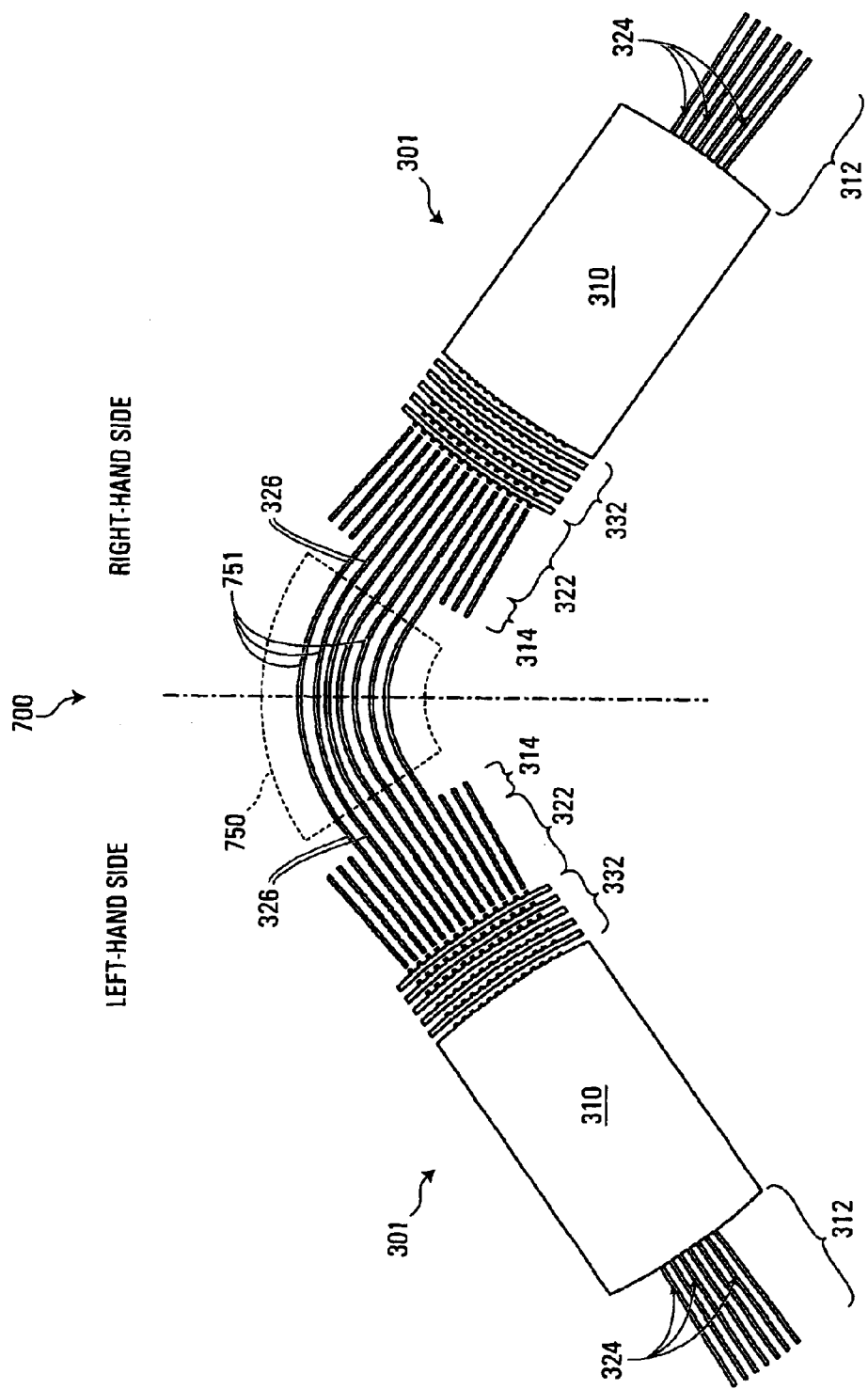
FIG. 5 is a top view of an AWG (Arrayed Waveguide Grating) demultiplexer/multiplexer according to another embodiment of the invention.

Referring to FIG. 5, shown is an AWG (Arrayed Waveguide Grating) demultiplexer/multiplexer 700 according to another embodiment of the invention. The AWG demultiplexer/multiplexer 700 has two star couplers 301 coupled by an AWG 750. The AWG 750 has a number of waveguides 751 of different optical path lengths (only 7 waveguides 751 are shown for clarity) for coupling respective ones of the first waveguides 326 of the two star couplers 301.

In demultiplexing applications, a multiplexed optical signal having a plurality of components of wavelengths, $\lambda_k$, is input into one of the second waveguides 324 of the second array 312 of the left-hand side star coupler 301. The multiplexed optical signal propagates through the slab waveguide 310 and into the transition regions 332, 322 and the first array 314 where each component of the multiplexed optical signal is split into a number of path signals each propagating through a respective one of the waveguides 751 of the AWG 750. In the AWG 750, the path signals each acquire a respective phase and then propagate into the right-hand side star coupler 301. The path signals of each component propagate into the first array 314, into the transition regions 322, 332, through the slab waveguide 310 and are coupled to a respective one of the second waveguides 324 through constructive interference. As such, each component of the mutiplexed optical signal is output from a respective one of the second waveguides 324 of the right-hand side star coupler 301.

In multiplexing applications, a reverse process is used in which optical signals each having a respective one of wavelengths, $\lambda_k$, are each input into a respective one of the second waveguides 324 of the right-hand side star coupler 301 and are multiplexed into a single optical signal which is output at one of the second waveguides 324 of the second array 312 of the left-hand side star coupler 301.

With the presence of transition regions 322, 332 in both star couplers 301 the insertion loss is substantially reduced allowing the AWG demultiplexer/multiplexer 700 to be manufactured with a high production yield while maintaining a low insertion loss.

Figure 6:
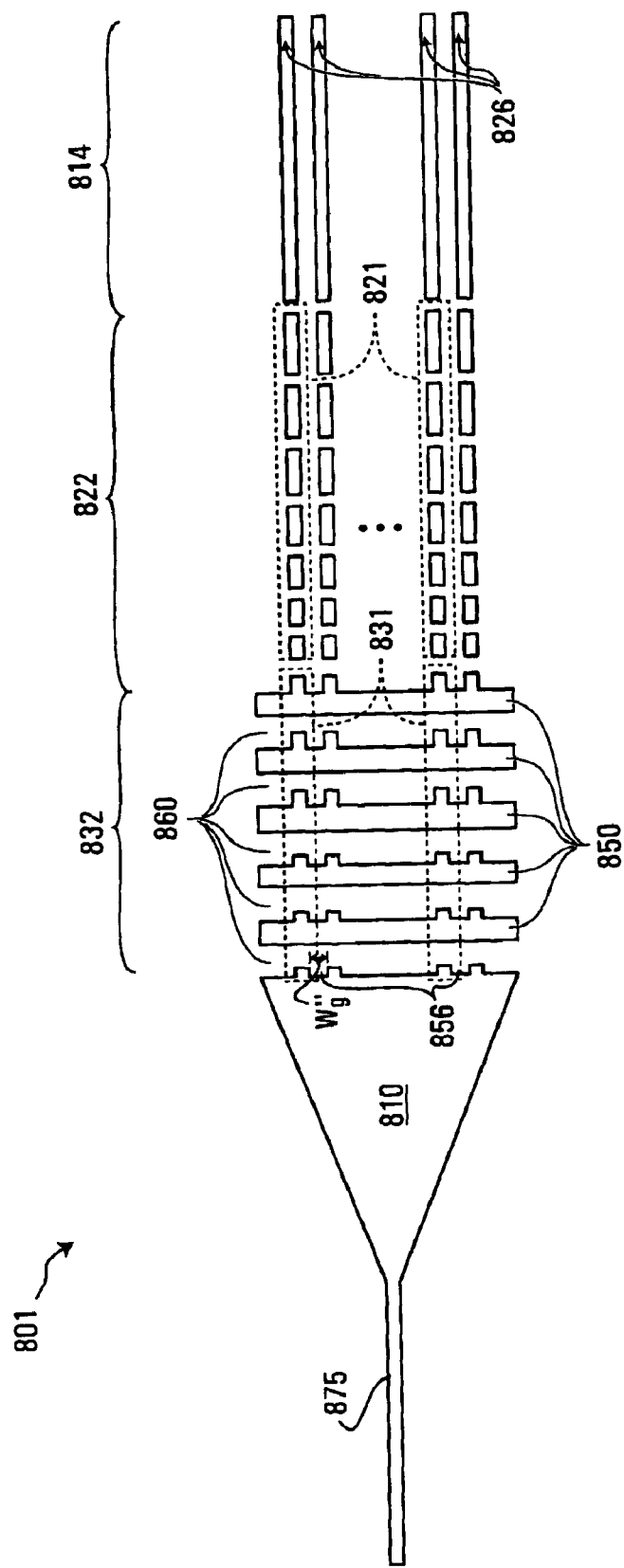
FIG. 6 is top view of a branch power splitter according to another embodiment of the invention.

Referring to FIG. 6, shown is a 1×N branch power splitter according to another embodiment of the invention. The power splitter is generally indicated by 801 and has a tapered waveguide 810, which is a particular case of a slab waveguide, first and second transition regions 832 and 822, respectively, and a first array 814 of M first waveguides 826 (only 4 first waveguides 826 are shown for clarity), wherein M is an integer satisfying M≧2. The first waveguides 826 are substantially straight and substantially parallel to each other. The second transition region 822 is located between the first transition region 832 and the first array 814 and has a plurality of second segmented waveguides 821 each aligned with a respective one of the first waveguides 826. Furthermore, the first transition region 832 is adjacent the tapered waveguide 810 and has a plurality of first segmented waveguides 831 each aligned with a respective one of the first waveguides 826 and a respective one of the second segmented waveguides 821. The first transition region 832 also has a plurality of parallel and substantially straight first and second transverse segments 850 and 860, respectively, which traverse the first segmented waveguides 831. The branch power splitter 801 also has a second waveguide 875 coupled to the tapered waveguide 810.

An optical signal, which is input at the second waveguide 875, propagates through the tapered waveguide 810 and into the first and second transition regions 832, 822, respectively, where it is split into M optical signals each propagating through a respective one of the first waveguides 826.

The transition regions 822, 832 provide a substantial reduction in the insertion loss of the power splitter 801 when compared to conventional power splitters. Furthermore, characteristics of the power splitter 801 allow the power splitter 801 to be fabricated with a width, $W_g''$, of gaps 856 of approximately 4 µm where the production yield is high while maintaining a low insertion loss.

Figure 7:
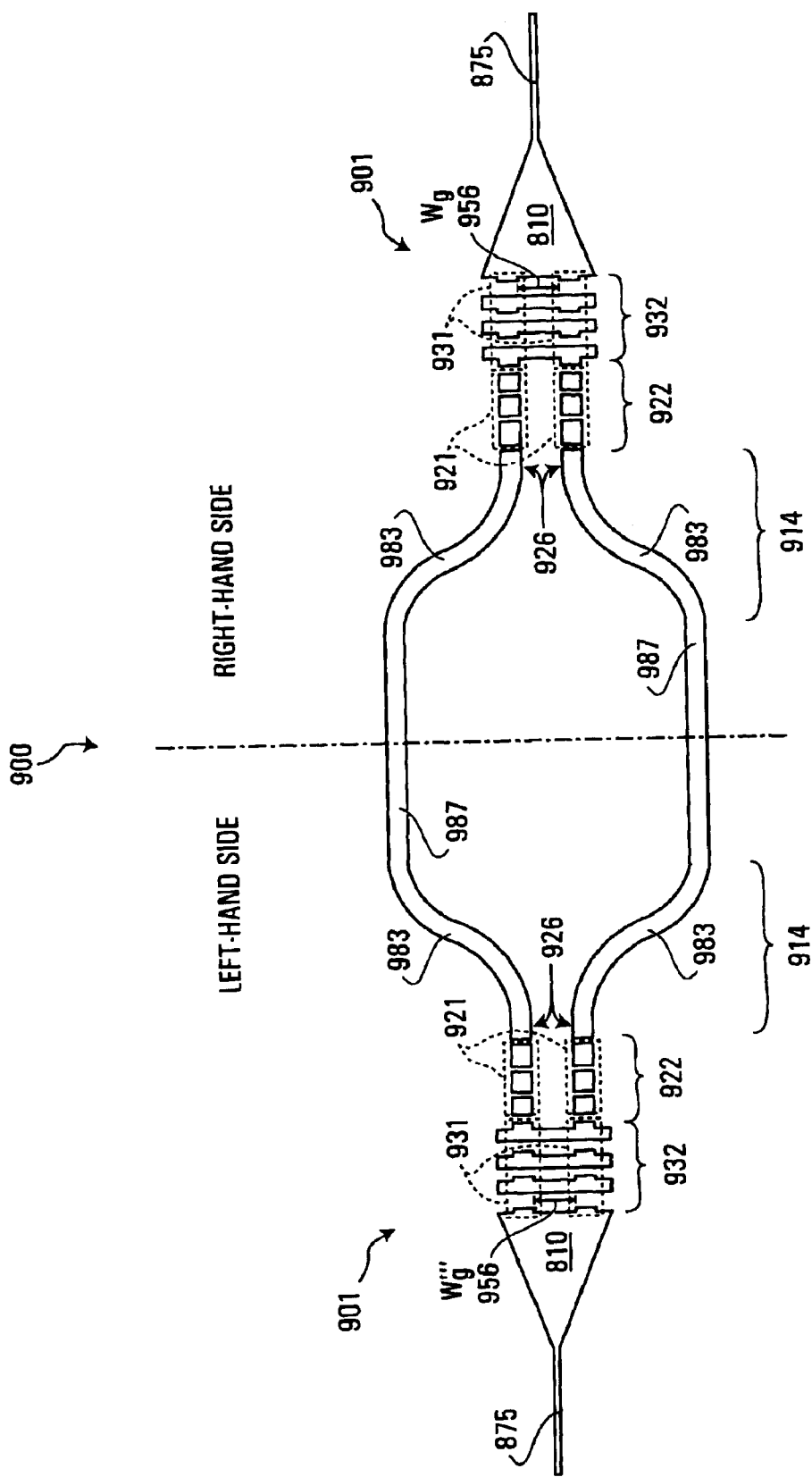
FIG. 7 is a top view of a Mach-Zehnder Interferometer structure according to yet another embodiment of the invention.

Referring to FIG. 7, shown in a MZI (Mach-Zehnder Interferometer) device, according to yet another embodiment of the invention. The MZI device is generally indicated by 900 and has two Y-junctions 901 coupled together through respective ones of second coupling waveguides 987. The Y-junctions 901 are similar to the power splitter 801 of FIG. 6, each having first and second transition regions, 932, 922, respectively, and a first array 914 of first waveguides 926; however, each first array 914 has only two first waveguides 926 and the first waveguides 926 have S-bends 983. Furthermore, the first transition regions 932 of both Y-junctions 901 each have only two first segmented waveguides 931. Similarly, the second transition regions 922 of both Y-junctions 901 each have only two second segmented waveguides 921. Each one of the first waveguides 926 of the left-hand side Y-junction 901 is coupled to a respective one of the first waveguides 926 of the right-hand side Y-junction 901 through the second coupling waveguides 987. The S-bends 983 are used to separate the second coupling waveguides 987. As in conventional MZI devices, in some embodiments of the invention the MZI device 900 is used, for example, as an optical modulator or a VOA (Variable Optical Attenuator); however, the first and second transition regions 932, 922 provide a reduced insertion loss when compared to the conventional MZI devices.

As an optical modulator or VOA, an optical signal is input into the second waveguide 875 of the left-hand side Y-junction 901 and is split into two path signals, in the left-hand side Y-junction 901, each propagating into a respective one of the second coupling waveguides 987. The two path signals are then combined, in the right-hand side Y-junction 901, into an output optical signal that is output through the second waveguide 875 of the right-hand Y-junction 901. In some embodiments of the invention, a heater (not shown) is used to heat one of the second coupling waveguides 987 and control the optical path length of the heated second coupling waveguide 987. Control of the optical path length of the heated second coupling waveguide 987 is used to provide a phase difference between the two path signals and modulate or control the intensity of the output signal. In other embodiments of the invention, an electrical device (not shown) is used to apply an electric field to one of the second coupling waveguides 987 and control the optical path length of the second coupling waveguide 987 upon which is applied the electric field.

The presence of the transition regions 922, 932 in both Y-junctions 901 results in a significant reduction in the insertion loss which is large enough to permit the MZI device 900 to be manufactured with dimensions that are large enough for a high production yield while maintaining a suitable insertion loss. For example, results from a BPM (Beam Propagation Method) analysis show that for Y-junction couplers 901 having gaps 956 of width, $W_g''$, of approximately 4 µm, the insertion loss of each Y-junction 901 is reduced from approximately 0.75 dB down to approximately 0.25 dB when the transition regions 922, 932 are present. Therefore, for the MZI device 900, the insertion loss is reduced from approximately 1.5 dB down to approximately 0.5 dB.

Numerous modifications and variations of the present invention are possible in light of the above teachings. It is therefore to be understood that within the scope of the appended claims, the invention may be practised otherwise than as specifically described herein.

I claim:

1. An optical coupling arrangement comprising:
 a first transition region comprising:
 a plurality of first segmented waveguides; and
 a plurality of transverse segments of alternating indices of refraction, at least some of the transverse segments traversing the first segmented waveguides,
 wherein the first transition region is delimited by the transverse segments and wherein the transverse segments and individual ones of the first segmented waveguides are adapted to provide mode expansion and mode contraction, respectively, in respect to a direction traversing the transverse segments.

2. An optical coupling arrangement according to claim 1 wherein the plurality of transverse segments of alternating indices of refraction comprise a plurality of first transverse segments of a core material and a plurality of second transverse segments of a cladding material, the first transverse segments being interleaved with the second transverse segments.

3. An optical coupling arrangement according to claim 2 wherein the first transition region has a first end and a second end with said direction traversing from first end to the second end and wherein for each one of the first transverse segments having a next first transverse segment of the first transverse segments which is farther from the first end than said one of the first transverse segments, a ratio of a width of said one of the first transverse segments to a total width of said one of the first transverse segments and an adjacent one of the second transverse segments is greater than or equal to a ratio of a width of said next first transverse segment to a total width of said next first transverse segment and an adjacent one of the second transverse segments.

4. An optical coupling arrangement according to claim 2 wherein the first transition region has a first end and a second end with said direction traversing from first end to the second end and wherein for each one of the first transverse segments having a next first transverse segment of the first transverse segments which is farther from the first end than said one of the first transverse segments, a width of said one of the first transverse segments is greater than or equal to a width of said next first transverse segment.

5. An optical coupling arrangement according to claim 2 wherein the first transition region has a first end and a second end with said direction traversing from first end to the second end and wherein for each one of the second transverse segments having a next second transverse segment of the second transverse segments which is farther from the first end than said one of the second transverse segments, a width of said one of the second transverse segments is less than or equal to a width of said next second transverse segment.

6. An optical coupling arrangement according to claim 2 where the first segmented waveguides are formed by core segments in at least some of the second transverse segments.

7. An optical coupling arrangement according to claim 6 wherein the core segments are protrusions each extending from a respective one of the first transverse segments.

8. An optical coupling arrangement according to claim 6 wherein the first transition region has a first end and a second end with said direction traversing from first end to the second end and wherein for each one of the second transverse segments having said core segments and having a next second transverse segment of the second transverse segments which also has said core segments and which is farther from the first end than said one of the second transverse segments, a width of said core segments of said one of the second transverse segments is less than or equal to a width of said core segments of the next second transverse segment.

9. An optical coupling arrangement according to claim 6 wherein the first transition region has a first end and a second end with said direction traversing from first end to the second end and wherein for each one of the second transverse segments having said core segments and having a next second transverse segment of the second transverse segments which also has said core segments and which is farther from the first end than said one of the second transverse segments, a ratio of a width of said core segments of said one of the second transverse segments to a width of said one of the second transverse segments is less than or equal to a ratio of a width of said core segments of said next second transverse segment to a width of said next second transverse segment.

10. An optical coupling arrangement according to claim 1 comprising:
    a second transition region coupled to the first transition region in a manner that said direction traverses from the first transition region to the second transition region, the second transition region having a plurality of second segmented waveguides each aligned with a respective one of the first segmented waveguides of the first transition region.

11. An optical coupling arrangement according to claim 10 wherein the second transition region has a first end and a second end with said direction traversing from first end to the second end and wherein, in the second transition region, each one of the second segmented waveguides comprises a plurality of first longitudinal segments of a core material and a plurality of second longitudinal segments interleaved with the first longitudinal segments, the second longitudinal segments having an index of refraction which is different than the index of refraction of the core material.

12. An optical coupling arrangement according to claim 11 wherein the second transition region has a first end and a second end with said direction traversing from first end to the second end and wherein within a second segmented waveguide of the second segmented waveguides, a ratio of a width of a first longitudinal segment of the first longitudinal segments to a total width of said first longitudinal segment and an adjacent one of the second longitudinal segments is less than or equal to a ratio of a width of a next first longitudinal segment of the first longitudinal segments to a total width of said next first longitudinal segment and an adjacent one of the second longitudinal segments, the next first longitudinal segment being located farther from the first end than said first longitudinal segment.

13. An optical coupling arrangement according to claim 11 wherein the second transition region has a first end and a second end with said direction traversing from first end to the second end and wherein within a second segmented waveguide of the second segmented waveguides, a width of a first longitudinal segment of the first longitudinal segments is less than or equal to a width of a next first longitudinal segment of the first longitudinal segments, the next first longitudinal segment being located farther from the first end than said first longitudinal segment.

14. An optical coupling arrangement according to claim 11 wherein the second transition region has a first end and a second end with said direction traversing from first end to the second end and wherein within each second segmented waveguide of the second segmented waveguides, a total width of a first longitudinal segment of the first longitudinal segments and an adjacent one of the second longitudinal segments is less than or equal to a total width of a next first longitudinal segment of the first longitudinal segments and an adjacent one of the second longitudinal segments, the next first longitudinal segment being located farther from the first end than said first longitudinal segment.

15. An optical coupling arrangement according to claim 1 comprising:
    a first array of first waveguides which is arranged to be coupled through to the first transition region in a manner that said direction traverses from the first transition region to the first array, wherein each one of the first waveguides of the first array is aligned with a respective one of the first segmented waveguides of the first transition region.

16. An optical device for combining/splitting optical signals comprising the optical coupling arrangement of claim 15 and comprising:
    a second array of one or more second waveguides; and
    a first coupling waveguide for coupling the one or more second waveguides of the second array with the first transition region.

17. An optical device according to claim 16 wherein the first coupling waveguide is a slab waveguide.

18. An optical device according to claim 16 wherein the first coupling waveguide comprises an end at which the first transition region is coupled, said end comprising protrusions extending perpendicularly from the first coupling waveguide into an adjacent one of the transverse segments, each one of the protrusions being aligned with a respective one of the first segmented waveguides of the first transition region.

19. An optical device according to claim 16 wherein the device is a star coupler.

20. An AWG (Arrayed Waveguide Grating) demultiplexer/multiplexer comprising two star couplers according to claim 19, the AWG demultiplexer/multiplexer further comprising:
    an AWG adapted to couple respective ones of said first waveguides of said first array of the two star couplers each with a respective optical path length.

21. A branch power splitter comprising an optical device according to claim 16 wherein the second array has one second waveguide.

22. A Y-junction comprising a branch power splitter according to claim 21 wherein the first array has two first waveguides.

23. A Mach-Zehnder interferometer device comprising two Y-junctions according to claim 22, the Mach-Zehnder interferometer device further comprising:
    second coupling waveguides each coupling respective nes of said first waveguides of said first array of the two Y-junctions.

24. A Mach-Zehnder interferometer device according to claim 23 comprising a heater adapted to control the optical path length of a second coupling waveguide of the second coupling waveguides.

25. A Mach-Zehnder interferometer device according to claim 23 comprising an electrical device adapted to apply an electric field to a second coupling waveguide of the second coupling waveguides to control the optical path length of said second coupling waveguide.

26. A Mach-Zehnder interferometer device according to claim 23 for use as an optical modulator.

27. A Mach-Zehnder interferometer device according to claim 23 for use as a variable optical attenuator.

* * * * *